(12) United States Patent
Potyrailo et al.

(10) Patent No.: US 8,717,146 B2
(45) Date of Patent: May 6, 2014

(54) METHODS AND SYSTEMS FOR INTEGRATED INTERROGATION OF RFID SENSORS

(75) Inventors: Radislav Alexandrovich Potyrailo, Niskayuna, NY (US); Harold Woodruff Tomlinson, Jr., Ballston Spa, NY (US); William Guy Morris, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 401 days.

(21) Appl. No.: 12/827,611

(22) Filed: Jun. 30, 2010

(65) Prior Publication Data

US 2012/0001730 A1 Jan. 5, 2012

(51) Int. Cl.
*H04Q 5/22* (2006.01)

(52) U.S. Cl.
USPC .................. 340/10.1; 340/572.1; 340/505

(58) Field of Classification Search
USPC ......................................... 340/505
See application file for complete search history.

(56) References Cited

U.S. PATENT DOCUMENTS

| | | | |
|---|---|---|---|
| 5,621,199 A | 4/1997 | Calari et al. | |
| 6,172,609 B1 | 1/2001 | Lu et al. | |
| 6,995,655 B2 | 2/2006 | Ertin et al. | |
| 7,161,357 B2 | 1/2007 | Lee et al. | |
| 7,180,403 B2 | 2/2007 | Quan | |
| 7,309,002 B2 | 12/2007 | Fernandez | |
| 7,323,996 B2 | 1/2008 | Mullins | |
| 7,339,481 B2 | 3/2008 | Duron | |
| 7,439,860 B2 * | 10/2008 | Andresky | 340/572.1 |
| 7,911,345 B2 * | 3/2011 | Potyrailo et al. | 340/572.1 |
| 2005/0104790 A1 * | 5/2005 | Duron | 343/745 |
| 2007/0222605 A1 * | 9/2007 | Andresky | 340/572.7 |
| 2008/0164977 A1 * | 7/2008 | Butler et al. | 340/10.1 |
| 2009/0204250 A1 * | 8/2009 | Potyrailo et al. | 700/109 |
| 2009/0278685 A1 | 11/2009 | Potyrailo et al. | |
| 2009/0289776 A1 * | 11/2009 | Moore et al. | 340/10.41 |
| 2010/0021993 A1 * | 1/2010 | Wang et al. | 435/286.1 |
| 2010/0073135 A1 * | 3/2010 | Potyrailo et al. | 340/10.1 |
| 2010/0134257 A1 * | 6/2010 | Puleston et al. | 340/10.4 |
| 2010/0225482 A1 * | 9/2010 | Kasai et al. | 340/572.1 |

OTHER PUBLICATIONS

Roy Want; "An Introduction to RFIT Technology"; PERVASIVE Computing, IEEE, vol. 5, pp. 25-33, Jan.-Mar. 2006.

Radislav A.Potyrailo et al.; "RFID sensors based on ubiquitous passive 13.56-Mhz RFID tags and complex impedance detection"; Published online Nov. 27, 2008 in Wiley InterScience; vol. 9, Issue 10, pp. 1318-1330.

Radislav A.Potyrailo et al.; "Integration of Passive Multivariable RFID Sensors into Single-Use Biopharmaceutical Manufacturing Components"; RFID, 2010 IEEE International Conference, pp. 1-7.

Radislav A.Potyrailo et al.; "Position-independent chemical quantitation with passive 13.56-Mhz radio frequency identification (RFID) sensors"; Available online Jun. 28, 2007; vol. 75, Issue 3, May 15, 2008,11 pages.

(Continued)

*Primary Examiner* — Travis Hunnings
(74) *Attorney, Agent, or Firm* — Jennifer E. Haeckl

(57) ABSTRACT

An integrated interrogator for a RFID sensor is provided. The integrated interrogator comprises a digital reader in communication with the RFID sensor, an impedance reader in communication with the RFID sensor, and one or more controllers that coordinate actions of the digital reader and the impedance reader.

18 Claims, 6 Drawing Sheets

(56) References Cited

OTHER PUBLICATIONS

K, Chang et al.; "Functional antenna integrated with relative humidity sensor using synthesised polyimide for passive RFID sensing", Electronics Letters, vol. 43, 4 pages.

Radislav A.Potyrailo et al.; "Development of radio-frequency identification sensors based on organic electronic sensing materials for selective detection of toxic vapors"; Journal of Applied Physics 106, Dec. 2009; 6 pages.

International search report from WO mailing date 0ct. 14, 2011. International Application No. PCT/SE2011/050806; International filing date Jun. 21, 2011; 7 Pages.

* cited by examiner

US 8,717,146 B2

METHODS AND SYSTEMS FOR INTEGRATED INTERROGATION OF RFID SENSORS

The U.S. Government has certain rights in this invention pursuant to National Institute of Environmental Health Sciences contract number 1R01ES016569-01A1.

BACKGROUND

The invention relates generally to sensors, and more particularly to systems and methods for interrogating radio frequency identification (RFID) sensors.

Generally, RFID readers are used to obtain digital data from RFID tags. Digital data may include, for example, digital identification of the tag, or any other information written and/or stored in a memory chip of the RFID tag. The RFID tags transmit electromagnetic signals at different relative levels of transmitted power at different times. Signals received by the RFID reader in combination with the transmitted relative power level of the received signals are employed to locate the RFID tags, and read the digital identification information from the RFID tag (e.g., from the memory chip or back-reflector structure of the RFID tag).

When the RFID tags are used in RFID sensors, separate readers are used to read the analog (e.g. sensing parameters) and digital (e.g. tag ID, stored user information) data from the RFID sensors. In cases where digital data as well as analog data are obtained from the RFID sensors, two different readers need to be employed. Use of two different readers increases the complexity, size and cost of the system.

Therefore, it is desirable to have an integrated interrogation system for RFID sensors that can read both digital and analog data from the RFID sensors.

BRIEF DESCRIPTION

In one embodiment, an integrated interrogator for a RFID sensor is provided. The integrated interrogator comprises a digital reader in communication with the RFID sensor, an impedance reader in communication with the RFID sensor, and one or more controllers that coordinate actions of the digital reader and the impedance reader.

In another embodiment, an interrogation system for interrogation of one or more RFID sensors is provided. The interrogation system comprises a reader antenna (pick up coil) that recieves and transmits a signal from the RFID sensors, and an integrated interrogator operatively coupled to one or more of the RFID sensors. The integrated interrogator comprises an impedance reader that measures an impedance spectrum of the RFID sensors, a digital data reader that reads data from a memory chip of the RFID sensors, and a controller that coordinates actions of the sensor response reader and the digital reader.

In yet another embodiment, a method for analog and digital data acquisition from one or more RFID sensors, disposed in an environment is provided. The method comprises sensing at least two of a physical, chemical or biological characteristic of the environment at least in part by measuring an impedance spectrum of a resonant antenna structure, and acquiring digital, or analog, or both digital and analog information relating to the RFID sensor.

In another embodiment, a method for acquiring data from a RFID sensor, which is receiving input from at least two analog sensors, disposed in an environment, to improve the RFID sensor's accuracy, precision or a combination thereof is provided. The method comprises monitoring a resistance of at least one of the analog sensor relative to least one of a physical, chemical or biological characteristic of the environment, monitoring a capacitance of at least one of the analog sensors relative to least one of the physical, chemical or biological characteristic of the environment; and analyzing the resistance and capacitance.

DRAWINGS

These and other features, aspects, and advantages of the invention will become better understood when the following detailed description is read with reference to the accompanying drawings in which like characters represent like parts throughout the drawings, wherein.

DETAILED DESCRIPTION

Figure 1:
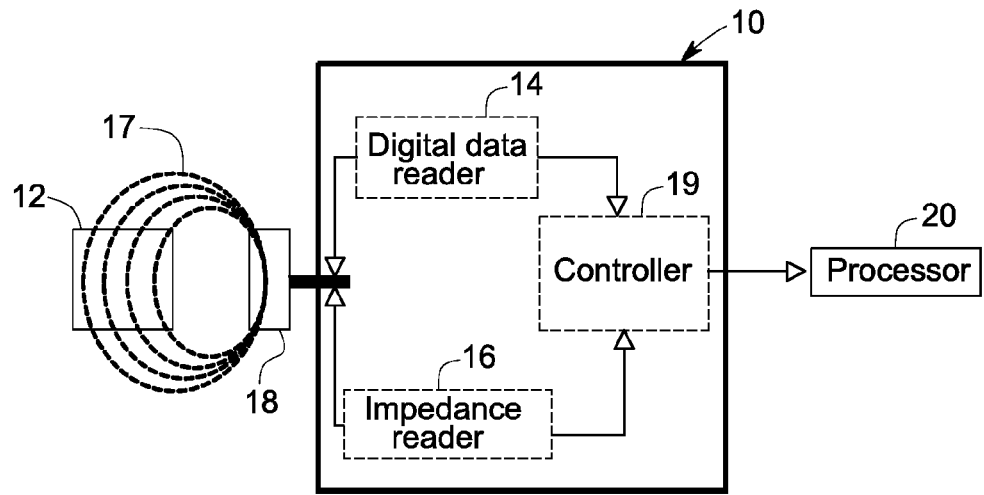
FIG. 1 is a schematic diagram of an example of an interrogation system for a RFID sensor comprising an integrated interrogator of the invention.

The embodiments disclosed herein facilitate integrated interrogation of RFID sensors. The RFID sensors may be used to measure a variety of physical, chemical and biological parameters. The methods and systems for integrated interrogation may be used to collect both digital and analog signals from the RFID sensor to obtain digital or analog data (e.g. tag ID, end-user stored information, sensing information, any other digital information available from the tag) corresponding to the RFID tag of the RFID sensors, and analog data (e.g., sensing measurements, reflected power measurements) corresponding to the RFID sensors. In certain embodiments, the integrated interrogator comprises a digital reader in communication with the RFID sensor, an impedance reader in communication with a sensor, and one or more controllers that coordinate actions of the digital reader and the impedance reader. In one example, the digital reader may be in communication with a memory chip of the RFID sensor. In one example, the digital reader may be in communication with a memory chip of the RFID sensor, where the memory chip has at least two sensor inputs. In this example, at least one sensor input measures sensor resistance, and at least one input measures sensor capacitance. In one example, the impedance reader may be in communication with the sensor resonant antenna structure. The sensing measurements of the impedance of the RFID sensor (resonant antenna structure) may be performed at frequencies close to the frequency of operation of the digital portion of the integrated interrogator. The digital portion of the impedance reader operates in accordance with accepted communication standards.

The RFID sensors may be wireless sensors or wired sensors. The wireless RFID sensors may be wirelessly coupled to the integrated interrogator. The wired sensors may be electrically coupled using wires to the integrated interrogator or other components of the sensor system. In embodiments where the sensor is a wireless sensor, the impedance reader may be in communication with the sensor resonant antenna structure, or sensor antenna. In embodiments where the sensor is a wired sensor, the impedance reader may be in communication with the sensor.

In one embodiment, the RFID tag of the RFID sensor may be a passive tag. A passive RFID tag does not need a battery for its function and comprises a memory chip that is coupled to the sensor antenna. In one embodiment, the integrated interrogator may be coupled to a finite electrical power source, which is self-contained (i.e., internal) within the integrated interrogator, such as a relatively small portable battery consisting of one or more disposable dry cells or rechargeable cells. Alternatively, the integrated interrogator may be operable using a power supply that is hard wired to a remote electrical power source, such as an electric grid. Alternatively, the integrated interrogator may be coupled to a finite electrical power harvesting source, such as a super capacitor, or other.

The distance between the passive RFID tag and the integrated interrogator is governed by the design parameters that include type of sensor (e.g. wired or wireless), operating frequency, RF power level, receiving sensitivity of the integrated interrogator, size of sensor antenna, data rate from the RFID sensor, communication protocol, and power requirements of the memory chip.

The integrated interrogator may provide sensor information to a central computing center using wireless communication. The integrated interrogator may be in communication with the central computing center via a network for processing the digital and analog data. The central computing center may be directly or indirectly coupled to one or more sensors (or neighboring sensors). In this way, the integrated interrogator may advantageously have access to information provided by other sensors. The neighboring sensors may measure same or different environmental parameters.

Non-limiting examples of a central computing center include a central hub or a cloud-computing cluster. As used herein, the term "cloud computing" is an Internet-based computing, whereby shared resources, software and information are provided to computers and other devices on-demand. A central processor might be used to generate detailed response models. Cloud computing may reduce the cost and capital expenditure. In addition, cloud computing may provide location independence by enabling the users to access the systems using a web browser regardless of their location or what device they are using (e.g., personal computer, or mobile). In one example, a cloud computing cluster would allow a user or automated system to dynamically evolve the model based on, for example, changing ambient noise parameters. Non-limiting examples of such ambient noise parameters include temperature, humidity or pressure. In some applications, these and other environmental parameters may be parameters of measurement interest. Values of ambient noise parameters may be provided using one or more sensors. The detailed response model may evolve based on neighbor sensors that provide similar or different sensing information about other measured parameters.

As illustrated in FIG. 1, an integrated interrogator 10 is operatively coupled to the RFID sensor 12. The integrated interrogator 10 comprises a digital reader/writer 14 in communication with the RFID sensor 12, and a reader antenna (pick up coil) 18. The terms "digital reader/writer" and "digital reader" may be used interchangeably throughout the application. The interrogator 10 further comprises an impedance reader 16 in communication with the reader antenna 18, and one or more controllers that coordinate actions of the digital reader/writer 14 and the impedance reader 16. The reader antenna 18 may generate a field 17 to interact with the RFID sensor 12. The field 17 may be a magnetic field, or an electric field.

The digital reader/writer 14 may perform both read and write functions. The digital reader/writer 14 may read and/or write data from an integrated circuit (IC) memory chip of the RFID sensor 12. In one embodiment, the digital reader 14 may read the digital data from the digital portion of the RFID tag of the sensor 12 and write digital data into a writable memory of the RFID tag. The writable memory of the RFID sensor 12 may be the IC memory chip. In another embodiment, the digital reader may read the digital data from a digital portion of the RFID sensor 12 that does not have a re-writable memory. For example, in case of a surface-acoustic wave RFID tag, the non-writable memory of the RFID tag may be a set of reflectors.

In one embodiment, the memory chip may be an integrated circuit memory chip or a memory chip based on read-only memory such as a surface acoustic wave device. The memory chip may be coupled to the sensor 12. The digital reader/writer 14 may be a single-frequency, single-protocol reading/writing device, or a multi-frequency, multi-protocol reading/writing device. Examples of single-frequency devices are devices that interrogate RFID tags only at a single given ISM (Industrial-Scientific-Medical) frequency range or at a frequency below 400 kHz. Non-limiting examples include frequencies of 120 kHz, 125 kHz, 128 kHz, 135 kHz, 6.78 MHz, 13.56 MHz, 27.125 MHz, 40.68 MHz, 433.92 MHz, 869.0 MHz, 915.0 MHz, 2.45 GHz, 5.8 GHz, 24.125 GHz. The digital reader 14 may be constructed for multi-frequency operation, where a reader can read digital information from different tags designed to operate at different frequencies. Each frequency has a frequency range around which the digital reader 14 operates to determine the presence of an RFID tag and to read the digital content of the RFID tag. In one example, a digital reader for 13.56 MHz interrogates an RFID tag using a frequency of 13.553 MHz, and detects the modulated output from the RFID tag between 13.11 MHz and 13.553 MHz as well as between 13.553 MHz and 14.01 MHz. Standard protocols may be used for reading digital data from the RFID sensor 12.

The impedance reader 16 measures impedance spectrum of the resonance sensor circuit of the RFID sensor 12. In addition to measuring the impedance spectrum, the impedance reader 16 may also perform analysis of the measured spectrum. Alternatively, the impedance spectrum may be transmitted to a remote location or a central computing center, and the analysis of the measured spectrum may be performed in the central computing center. The impedance spectrum may be analyzed simultaneously using various parameters for analysis, such as, the frequency of the maximum of the real part of the impedance (Fp), the magnitude of the real part of the impedance (Zp), the resonant frequency of the imaginary part of the impedance ($F_1$), and the anti-resonant frequency of the imaginary part of the impedance ($F_2$), signal magnitude ($Z_1$) at the resonant frequency of the imaginary part of the complex impedance ($F_1$), signal magnitude ($Z_2$) at the anti-resonant frequency of the imaginary part of the complex impedance ($F_2$), and zero-reactance frequency (Fz, frequency at which the imaginary portion of impedance is zero). Other parameters may be simultaneously measured using the entire complex impedance spectra, for example, quality factor of resonance, phase angle, and magnitude of impedance. Multivariable response parameters are described in U.S. patent application Ser. No. 12/118,950 entitled "Methods and systems for calibration of RFID sensors", which is incorporated herein by reference.

A controller 19 may be used to coordinate actions of the digital reader 14 and the impedance reader 16. For example, the controller 19 may be used to control the order/sequence in which the digital reader 14 and the impedance reader 16 measure/read from the RFID sensor 12. In one embodiment, the controller may be configured to receive input from a user to determine the order for the digital reader 14 and the impedance reader 16 to measure/read data from the RFID sensor 12.

Although not shown, a communication module may be operatively coupled to the interrogator 10. The communication module may be used to communicate with external devices, such as a processor 20, or a network. Non-limiting examples of the communication module include wireless communication modules and USB communication modules. In one example, the communication module may be a component of the controller 19.

The processor 20 may process the analog and digital data received from the RFID sensor 12. The processor 20 may be either external or internal to the integrated interrogator 10. That is, the processor 20 may be either part of the integrated interrogator 10 or may be separately provided along with the integrated interrogator 10. In one example, the impedance reader 16 may be a component of the internal processor 20. The processor 20 may be in communication with the integrated interrogator 10 directly or via a network. The processor 20 may be locally or remotely located with respect to the integrated interrogator 10. For example, a remotely located processor 20 may be present in a remotely located central computing center with respect to the integrated interrogator 10. In addition to processing the sensor data (analog and digital data), the processor 20 may be configured to display the processed data. The processor 20 may be configured to receive user inputs and transmit the received inputs to the integrated interrogator 10. For example, the processor 20 may receive user inputs regarding the sequence for collecting analog and digital data; the processor 20 may then pass the inputs to the controller 19 (or the communication module).

Figure 2:
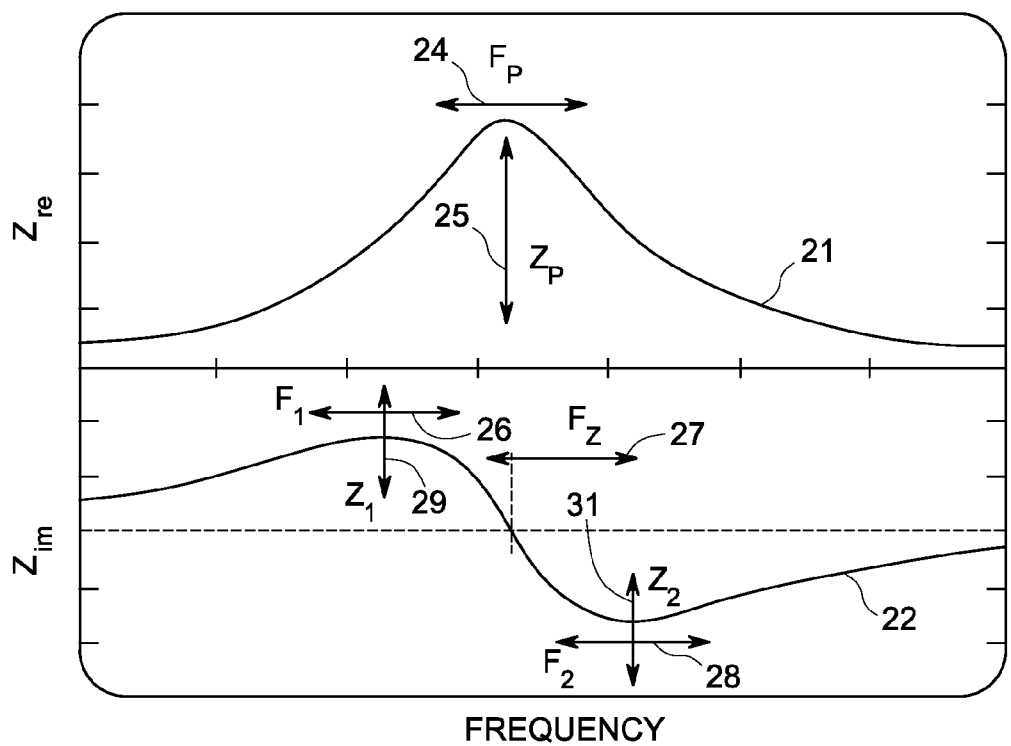
FIG. 2 is a graph of measured impedance parameters of an embodiment of the RFID sensor of the invention.

The combination of components of sensor circuit result in the generation of an impedance response formed by resonant circuit parameters such as $F_p$, $Z_p$, $F_1$, $Z_2$ and any other generated from the RFID tag of the RFID sensor. FIG. 2 illustrates examples of real and imaginary portions of the impedance response spectrum of the sensor. As illustrated by the curve 21, the real part of the impedance includes parameters $F_p$ 24 and $Z_p$ 25. The parameter $F_p$ 24 represents the frequency of the maximum of the real part of the impedance, and the parameter $Z_p$ 25 represents the magnitude of the real part of the impedance. Similarly, as illustrated by the curve 22, the imaginary part of the impedance includes $F_1$ 26, $F_2$ 28, Fz 27, $Z_1$ 29, and $Z_2$ 31. The parameter $F_1$ 26 represents resonant frequency of the imaginary part of the impedance, and the parameter $F_2$ 28 represents anti-resonant frequency of the imaginary part of the impedance. The parameters $F_1$ and $F_2$ are related to different components of the equivalent circuit. The parameter $Z_1$ 31 represents signal magnitude at the resonant frequency of the imaginary part of the complex impedance $F_1$ 26. The parameter $Z_2$ 31 represents signal magnitude at the anti-resonant frequency of the imaginary part of the complex impedance $F_2$ 28. The parameter Fz 27 represents the zero-reactance frequency. Additional non-limiting examples of the sensor parameters include parameters that can be extracted from the response of the equivalent circuit of the RFID sensor, the quality factor of resonance, phase angle, and magnitude of impedance of the resonance circuit response of the RFID sensor, and others known in the art. The difference between $F_1$ 26 and $F_2$ 28 is related to peak width. In this example, since $F_1$ 26 and $F_2$ 28 are related to different components of an equivalent circuit, $F_1$ 26 and $F_2$ 28 are not correlated. Peak symmetry may be affected by changes in impedance. Other parameters can be measured using the entire impedance spectrum, for example, using the quality factor of resonance, phase angle, and magnitude of impedance.

The sensor may sense at least two of chemical, biological or physical parameters. In one embodiment, a sensing material, such as a sensing film, may be disposed on the sensor antenna. In this embodiment, any changes in the film may affect the sensor response. In one embodiment, an antenna is made in part from material that is responsive to environment. In this embodiment, the antenna is sensitive to the environment.

Two different approaches may be used for sensing. In one approach, a sensing material may be disposed on the sensor antenna to alter the impedance response of the sensor. Any changes in the sensing material film may affect the sensor response. In another approach, a complementary sensor may be attached across an antenna and an optional memory chip. The complementary sensor may be used to alter sensor impedance response. Any changes in the complementary sensor that is attached to the sensor antenna may affect the sensor response. Examples of such complementary sensors are described in U.S. patent application Ser. No. 12/118,950, entitled "Methods and systems for calibration of RFID sensors", which is incorporated herein by reference.

Figure 3:
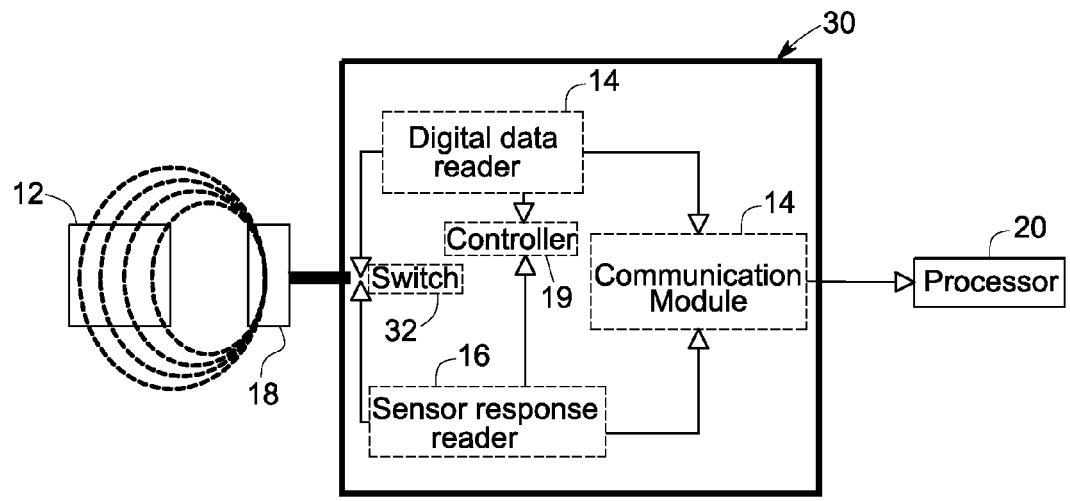
FIGS. 3-4 are schematic diagrams of examples of interrogation systems for RFID sensors comprising an integrated interrogator of the invention.

Referring to FIG. 3, a switch 32 is provided in the integrated interrogator 30 for switching between analog and digital data acquisition. For example, the integrated interrogator 30 uses the switch 32 to read digital data (e.g., from the IC memory chip), and analog data (e.g., impedance spectrum of the resonant sensor circuit) in rapid sequence. In one embodiment, the switch 32 may be controlled using the controller 19. The switch 32 may be a component of the controller 19. Alternatively, the switch 32 may be physically external from the controller 19, while the switches' function is still controlled by the controller 19.

Figure 4:
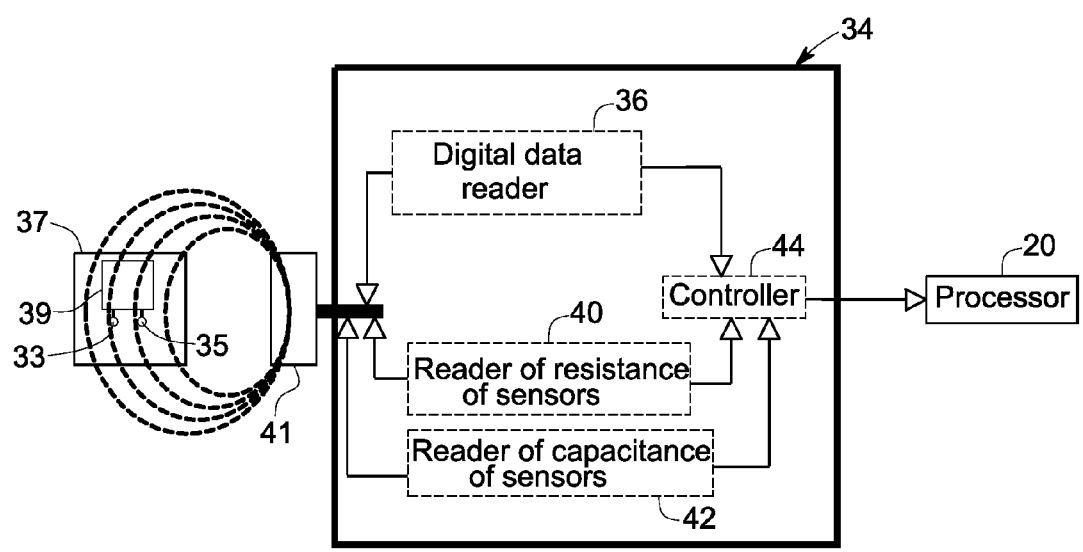

FIG. 4 illustrates an integrated interrogator 34 that measures the responses of at least two sensors coupled to the RFID sensor 37. The integrated interrogator 34 comprises a digital data reader 36 that reads the digital data from the memory chip of the RFID sensor 37. The memory chip comprises at least two sensing inputs, which are read by the integrated interrogator 34 for interrogation of the RFID sensor 37. Analog sensors 33 and 35 are connected to the inputs of the RFID sensor 37. In one example, the analog sensor 33 may be a resistance sensor, and the analog sensor 35 may be a capacitance sensor. Alternatively, although not shown, a single sensor that may produce both resistance and capacitance measurable responses may be coupled to the input of the RFID sensor 37. As illustrated, in the integrated interrogator 34, a reader 40 monitors resistance of the analog sensor 33, and a reader 42 monitors capacitance of the connected analog sensor 35. Both the sensors 33 and 35 are coupled to a memory chip 39. The combination of the measured sensing parameters (resistance and capacitance) provides enhanced ability of the digital RFID sensor 37 to operate as a selective sensor for detection and quantitation of environmental parameters of interest (e.g. vapors concentrations, temperature, pressure, etc.) in the presence of high levels of interferences. The integrated interrogator 34 comprises a reader antenna 41 that recieves and transmits a signal from th RFID sensor 37 and the integrated interrogator 34 operatively coupled to the RFID sensor 37. In one embodiment, although not shown, three analog sensors may be coupled to a memory chip 39, where a first sensor measures resistance, a second sensor measures capacitance, and a third sensor measures inductance of the sensing material, such as sensing film, deposited on the sensors. The type of the sensing film deposited on the three sensors may be same or different. The changes in measurable dielectric properties of the sensing film from these sensors may be correlated to the physical, chemical or biological characteristic of the environment. Alternatively, there may be one analog sensor connected to the memory chip 39, where the single sensor measures resistance, capacitance, and inductance of the sensing film deposited on the sensor.

Sensor impedance spectra are processed to extract several spectral parameters such as $F_p$, $Z_p$, $F_1$, or $F_2$ and others. The sensor impedance spectrum may be transmitted to the central computing center for processing. In one example, the central computing center may analyze at least a portion of the impedance spectrum or spectral features using steady state or dynamic responses from the impedance reader. The steady state sensor response is a response from the sensor over a determined period of time, where the response does not appreciably change over the measurement time. Thus, measurements of steady state sensor response over time produce similar values. The dynamic sensor response is a response from the sensor upon a sudden change in the measured environmental parameter (temperature, pressure, chemical concentration, biological concentration, etc.) Thus, the dynamic sensor response significantly change over the measurement time. Thus, measurements of dynamic sensor response over time produce dynamic signature of response. Non-limiting examples of the dynamic signature of the response include average response slope, average response magnitude, largest positive slope of signal response, largest negative slope of signal response, average change in signal response, maximum positive change in signal response, and maximum negative change in signal response.

In one example, the central computing center may analyze the full impedance spectrum using multivariate analysis. As used herein, 'multivariate analysis' refers to an analysis of signals where one or more sensors produce multiple response signals that may or may not be substantially correlated with each other. The multiple response signals from the sensors may be analyzed using multivariate analysis tools to construct response patterns of exposures to different environmental conditions, such as, pressure, temperature, liquids, biological species, and gases. Non-limiting examples of multivariate analysis tools include canonical correlation analysis, regression analysis, nonlinear regression analysis, principal components analysis, discriminate function analysis, multidimensional scaling, linear discriminate analysis, logistic regression, or neural network analysis. In another example, the central computing center may analyze full impedance spectrum or spectral features using responses from the RFID sensor and its neighboring sensors. In one embodiment, the central computing center may be remotely located with respect to the integrated interrogator. In this embodiment, the impedance spectrum or sensor parameters may be analyzed at a remote location away from the location of the RFID sensor. Non-limiting examples of such multivariate analyses are described in U.S. patent application Ser. No. 12/118,950 entitled "Methods and systems for calibration of RFID sensors", which is incorporated herein by reference.

The integrated interrogator provides flexibility to the system because it can operate using multiple standards for reading digital data. Non-limiting examples of standards include ISO 7816, ISO 14443, ISO 15693, ISO 18000, ISO 11784, ISO 11785. ISO 7816 is the standard for contact chip cards. ISO 7816-1 describes electrical and mechanical issues; ISO 7816-2 describes size, order and functionality of contact areas of the card and position of magstripe, if equipped with. ISO 14443 is the standard for contactless proximity cards operating at 13.56 MHz in up to 5 inches distance. ISO 15693 is the standard for contactless vicinity cards, such as cards that can be read from a greater distance as compared to proximity cards. ISO 15693 systems operate at a 13.56 MHz frequency and offer maximum read distance of 1-1.5 meters. ISO 18000 is the standard for item management air interface, including: ISO 18000-1 for generic parameters for air interface for global interface; ISO 18000-2 for parameters for air interface that operate at less than about 135 kHz; ISO 18000-3 for parameters for air interface at 13.56 MHz; ISO 18000-4 for parameters for air interface at 2.45 GHz; ISO 18000-5 for parameters for air interface at 5.8 GHz; ISO 18000-6 for parameters for air interface at 860-930 MHz; and ISO 18000-7 for parameters for air interface at 433 MHz. ISO 11784 and ISO 11785 are standards for the radio-frequency identification of animals. ISO 11784 describes the code structure and the information content of the codes stored in the transponder. ISO 11785 describes the technical concept for the radio-frequency identification of animals, such as the characteristics of the transmission protocols between transponder and transceiver. Any other protocols of reading digital data from RFID tags can be also be used.

The methods and systems enable determination of sensor parameters while maintaining low noise levels. The spectrum parameters are determined, with minimized uncertainty for further multivariate analysis by scanning the frequency range with a constant predetermined resolution. The number of waveforms may range from 1 to 10000, and the number of scans may range from 1 to 10000. The waveforms may be averaged if the number of waveforms is more than 2. Scans may be averaged if the number of scans is more than 2. A function, such as a mathematical function, may be applied to fit the resonance portion of the scan. In one embodiment, the mathematical function may be applied to fit the resonance portion of the scan that comprises 35 percent or less of the total data points in the scan. In one embodiment, the function may be applied to fit the resonance portion of the scan that comprises a Lorentzian lineshape fit or a baseline-corrected Lorentzian lineshape fit. Peak positions and magnitude of the peaks may be extracted using the mathematical function Impedance spectrum may be measured with the constant or variable scan speed across a frequency range. The variable scan speed across the frequency range may be used to reduce measurement noise while scanning over a resonance frequency range. Impedance spectrum may be measured with a constant or variable scan frequency resolution across the frequency range. The variable frequency resolution across frequency range may be used to reduce measurement noise over scanning over a resonance frequency range.

In certain embodiments, the integrated interrogator may enable low-power consumption operation. In one example, the components of the integrated interrogator are able to operate using a battery source or an energy-harvesting source. Non-limiting examples of energy-harvesting sources include supercapacitors, sources based on ambient light, sources based on human motion, sources based on industrial vibration, sources based on thermal energy (human and industrial) or sources based on radio frequency energy from cell phones.

In certain embodiments, the impedance reader is a part of a wireless system, such as a personal computer, personal digital assistant (PDA), or cell phone. The impedance reader may provide near-field communication ability. As used herein, the term "near field communication (NFC)" means a short-range wireless communication technology in a frequency range of 3 MHz to about 30 MHz (known as high frequency communication), which enables the exchange of data between devices which may be either in contact, or at a distance of up to about 1 m.

FIGS. 5-8 illustrate examples of relative frequency ranges that may be used for integrated interrogation of a RFID sensor. In some embodiments, sensing measurements of impedance spectrum may be performed at frequencies close to the frequency of operation of the digital portion of the reader where the digital portion of the reader operates in accordance with communication standards. In other embodiments, sensing measurements are performed by scanning lower or higher frequencies compared to the frequency band that is used for reading of digital information from the RFID sensor.

Figure 5:
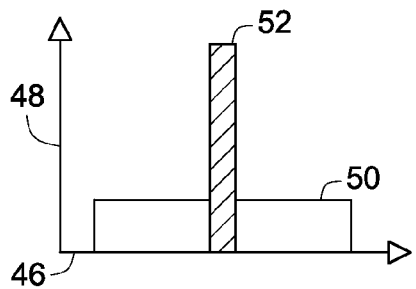
FIGS. 5-8 are graphs of examples of relative frequency ranges for sensing analog and digital data using the integrated interrogator.

Frequency scanning may be performed at different radio frequency (RF) power levels according to the power level permitted by the regulatory limits (e.g. FCC limits) in the frequency band. The frequency scanning time may be reduced for frequency bands that permit a higher RF power level, while maintaining the same signal-to-noise ratio for the impedance measurement over the entire frequency range. Frequency scanning for measurements of sensing response may be performed at a constant rate across a desired frequency band or at a variable scanning rate with an RF power level adjusted to match the regulatory limit in a particular frequency range As illustrated in FIG. 5, abscissa 46 represents frequency and ordinate 48 represents RF power level. The sensing or analog measurements may be performed by scanning frequencies 50 across the frequency band 52 that is used for reading digital information from the RFID sensor. In the example shown in FIG. 6, sensing measurements may be performed by scanning lower frequencies 54 compared to the frequency band 56 that is used for reading of digital information from the RFID sensor. In the example shown in FIG. 7, sensing measurements may be performed by scanning higher frequencies 58 compared to the frequency band 60 that is used for reading the digital information from the RFID sensor. In the example shown in FIG. 7, the scanning may be performed at two different RF power levels 62 and 64. The power levels 62 and 64 are selected according to the power levels permitted by the regulatory limits in the corresponding frequency bands 66 and 68, respectively. The frequency band 70 is used in this example for reading the digital information from the RFID sensor. Using the example of FIG. 8, the frequency scanning time may be reduced for frequency bands that permit a higher RF power level, while maintaining the same signal-to-noise ratio for the impedance measurement over the entire frequency range.

Figure 6:
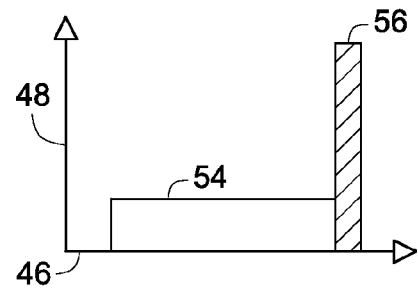
Figure 7:
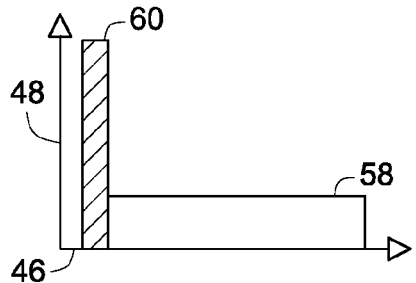
Figure 8:
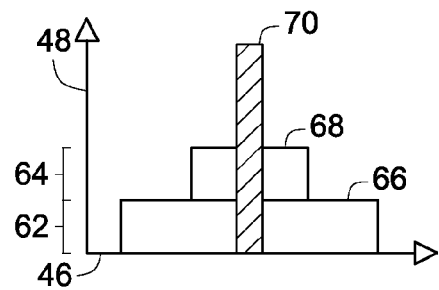

The relative frequency ranges for the step of sensing and acquiring digital information may vary as shown in FIGS. 5-8. In one embodiment, the step of sensing is performed at scanning frequencies within 10 GHz of the frequency band of the digital reader. The scanning frequency range of the sensor response reader (impedance reader) may be in a range from about 100 kHz to 25 GHz. In one example, the sensing may be performed at scanning frequencies within 10 MHz of the frequency band of the digital reader. In one example, the range of interest for the scanning frequency is about 13 MHz with a scan range of about 10 MHz. For example, a scanning frequency range of the sensor response reader or impedance reader is from about 3 to 25 MHz. To achieve the relative frequency ranges for the step of sensing and acquiring digital information that may vary as shown in FIGS. 6 and 7, a sensing portion of the sensor RFID tag has an antenna that operates in one frequency range and a digital portion of the RFID tag has another antenna that operates in another frequency range.

Figure 9:
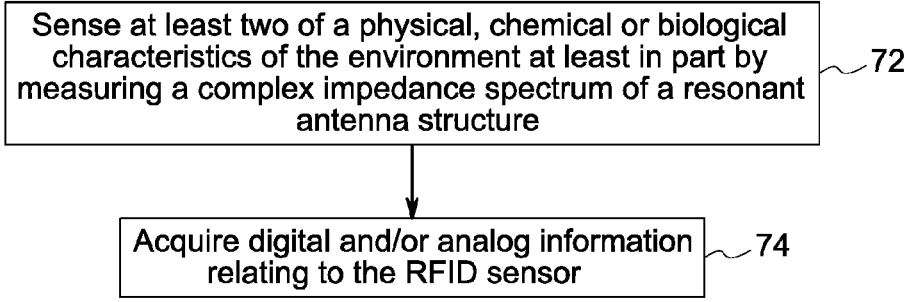
FIGS. 9-10 are flow charts of the steps of example methods of the invention for measuring at least two of a physical, chemical or biological characteristics of the environment.

FIG. 9 illustrates a method for acquiring analog and digital data from a RFID sensor in a given environment. At block 72, at least two of a physical, chemical or biological characteristics of the environment are simultaneously sensed at least in part by measuring an impedance spectrum of a resonant antenna structure of the RFID sensor. At block 74, analog and/or digital information relating to the tag of the RFID sensor is acquired. The digital information may be acquired from a memory chip of the RFID sensor. The order of blocks 72 and 74 may be reversed. That is, the analog and/or digital information relating to the RFID sensor may be acquired first, and the analog information relating to the characteristics of the environment being sensed may be acquired later. In one embodiment, sensing and information gathering relating to the RFID tag (such as tag ID) may be performed at least periodically by the integrated interrogator. In another embodiment, the steps of sensing the characteristics of the environment, and acquiring the digital information, may be performed simultaneously, periodically or sequentially. The acquired impedance spectrum may be analyzed at a remote location, such as a remotely located central computing center.

Figure 10:
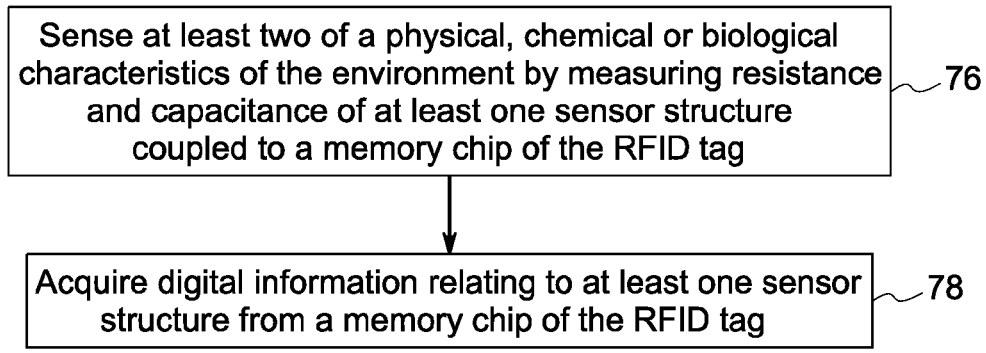

FIG. 10 illustrates a method for acquiring sensor data from a RFID sensor disposed in an environment, where the RFID sensor is receiving input from at least two analog sensors is provided. The method comprises measuring responses of the at least two analog sensors coupled to the RFID tag of the RFID sensor. Receieving the input from the two analog sensors improves the accuracy, precision, or both, of the RFID sensor. At block 76, at least two of a physical, chemical or biological characteristics of the environment are determined by measuring resistance and capacitance of at least one sensor structure connected to a memory chip of the RFID tag. The method comprises monitoring a resistance of at least one of the analog sensors relative to the environmental characteristics, and monitoring a capacitance of at least one of the analog sensors relative to environmental characteristics. In the memory chip, the analog signals of resistance and capacitance are converted into digital information related to resistance and capacitance. At block 78, this digital information relating to at least one of the RFID sensors is acquired from a memory chip of the RFID sensor. The resistance and the capacitance are analyzed to measure at least two of the physical, chemical or biological characteristics. The steps of analyzing the resistance and the capacitance may be performed simultaneously to reduce or eliminate interference effects from the sensor data.

In one embodiment, a method for measuring at least three responses from a sensor or sensors connected to a RFID tag is described. At least two of a physical, chemical or biological characteristics of the environment are determined by measuring resistance, inductance, and capacitance of at least one sensor structure coupled to a memory chip of the RFID tag. In the memory chip, the analog signals of resistance, inductance, and capacitance are converted into digital information related to resistance, inductance, and capacitance. This digital information relating to at least one of the RFID sensors is acquired from a memory chip of the RFID sensor. The resistance, inductance, and capacitance may be analyzed to measure at least two of the physical, chemical or biological characteristics. The steps of analyzing the resistance, the inductance, and the capacitance may be performed simultaneously to reject effects of interferences from measured sensor response.

Figure 11:
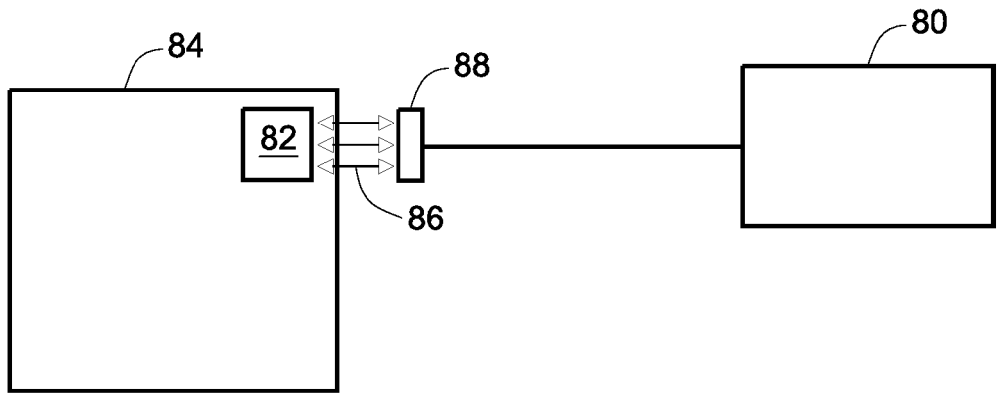
FIG. 11 is a schematic diagram of a disposable bioprocess component using an RFID sensor, and an integrated interrogator for the RFID sensor.

An example of an application of the integrated interrogator 80 is shown in FIG. 11. In this embodiment, an RFID sensor 82 is disposed in or on a disposable bioprocess component 84.

As represented by arrows 86, the RFID sensor 82 is in wireless communication with a reader antenna 88. The reader antenna 88 is, in turn, in operative association with the integrated interrogator 80. The reader antenna 88 and the integrated interrogator 80 may be in operative association using physical contact (wired connection). The reader antenna 88 and the sensor 82 may be physically coupled using wired connection. Alternatively, the reader antenna 88 and the sensor 82 may wirelessly communicate. In one example, the disposable component 84 may be manufactured for disposable bioprocesses such as pharmaceutical, biopharmaceutical manufacturing and other processes. For example, the disposable component 84 may be used in a pharmaceutical production process and may include components such as, but not limited to, bioreactors, mixers, product transfer lines, connectors, filters, chromatography columns and centrifuges. In one example, the RFID sensor 82, in conjunction with integrated interrogator 80, enables the in-line manufacturing, monitoring and control of the bioprocess.

Figure 12:
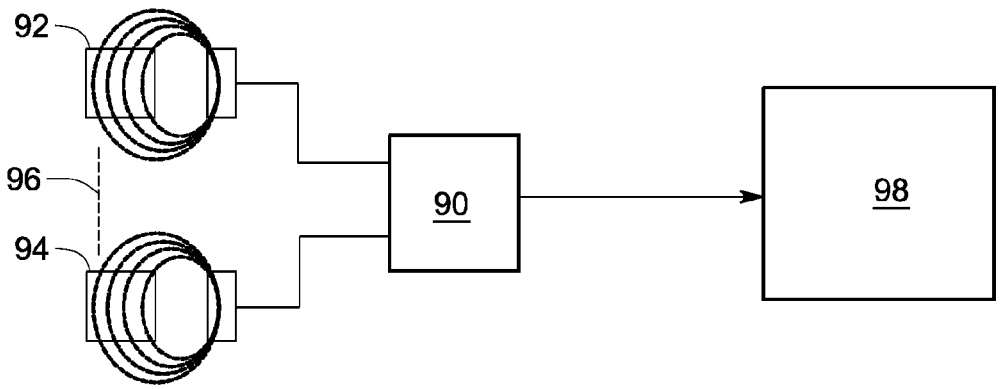
FIG. 12 is a schematic diagram of an example of an interrogation system of the invention for interrogation of a plurality of RFID sensors.

FIG. 12 is a schematic diagram of an example of an interrogation system of the invention for interrogating two or more RFID sensors using an integrated interrogator 90. In one embodiment, the integrated interrogator 90 may interrogate digital and analog signals from a plurality of sensors, generally represented by the reference numerals 92 and 94. The dashed line 96 represents a plurality of sensors present between the sensors 92 and 94. The plurality of sensors 96, and the sensors 92 and 94, may have similar or different structures depending on the particular environmental parameter that these sensors are designed to sense. In one example, the information from the different sensors 92, 94 and 96 may be combined to provide sensor responses corresponding to different environmental parameters. In another example, some sensors may be designed to measure environmental parameters, such as temperature or pressure, while the other sensors may be designed for other applications, such as analyte detection.

Although not shown, such an integrated interrogator 90 may include, for example, either a switch or a multiplexer. The multiplexer may select one or more analog and/or digital input signals from the determined number of sensors, and forward the selected input to a central computing center 98. Alternatively, the integrated interrogator 90 may be configured to analyze the various analog and digital inputs from the different sensors 92, 94 and 96, and may not require the central computing center 98.

Figure 13:
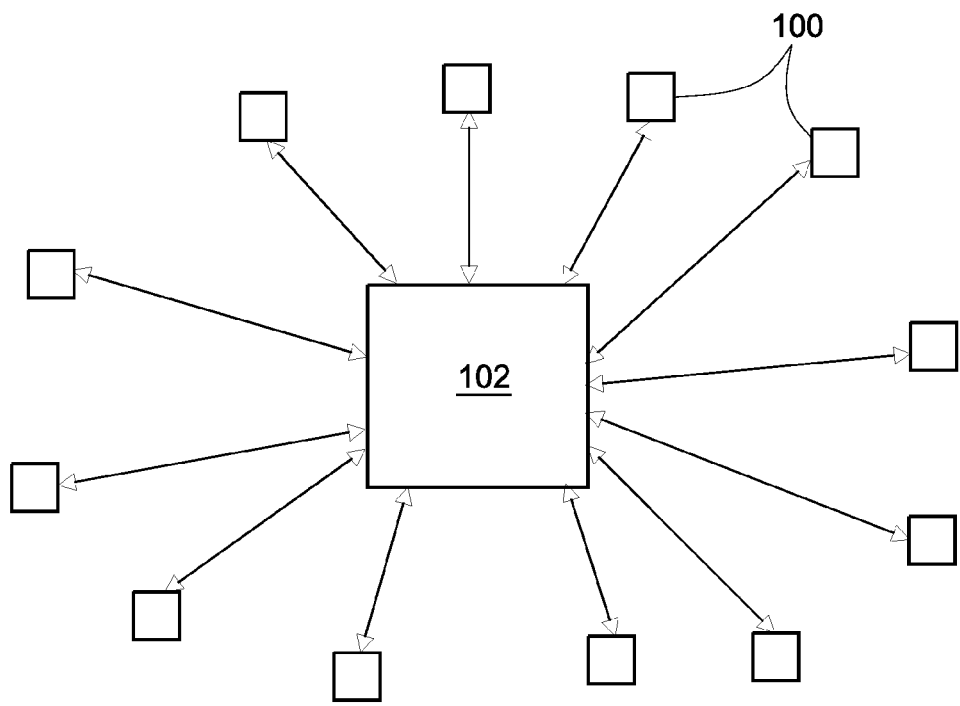
FIG. 13 is a schematic diagram of an example of an interrogation system of the invention using a central computing center.

FIG. 13 illustrates an arrangement having a plurality of interrogation systems 100. Each of the interrogation systems 100 may comprise one or more RFID sensors, and an integrated interrogator. Some of the plurality of interrogation systems 100 may share a common integrated interrogator. Interrogation systems 100 are operatively associated with each other by a central computing center 102. In this way, the integrated interrogators of the plurality of interrogation systems 100 may advantageously have access to information provided by other sensors. The interrogation systems 100 may use a communication module in their integrated interrogator to communicate with the central computing center 102.

In one embodiment, the central computing center 102 may be remotely located with respect to the interrogation systems 100. In this embodiment, the impedance spectrum or sensor parameters may be analyzed at a remote location away from the location of the RFID sensors.

Frequency scanning for measurements of sensing response may be performed at a constant rate across a desired frequency band or at a variable scanning rate with an RF power level adjusted to match the regulatory limit in a particular frequency range.

EXAMPLE 1

Measurements of the impedance of RFID sensors were performed using a network analyzer (Agilent Technologies, Inc. Santa Clara, Calif.) under a computer control using LabVIEW. The analyzer was used to scan the frequencies over the range of interest (typically centered at 13 MHz with a scan range of ~10 MHz) and to collect the impedance response from the RFID sensor. A multichannel electronic signal multiplexer was built to operate with the analyzer for measurements of two or more RFID sensors at once. The collected impedance spectrum was analyzed using Excel (MicroSoft Inc. Seattle, Wash.) or KaleidaGraph (Synergy Software, Reading, Pa.) and PLS_Toolbox (Eigenvector Research, Inc., Manson, Wash.) operated with Matlab (The Mathworks Inc., Natick, Mass.). Digital ID readings from the memory chips of RFID sensors were performed with several RFID readers that included a handheld SkyeTek reader (Model M-1, Westminster, Colo.), and a SkyeTek computer-controlled (using LabVIEW) reader (Model M-1, SkyeTek, Westminster, Colo.), and a computer-controlled multi-standard RFID Reader/Writer evaluation module (Model TRF7960 Evaluation Module, Texas Instruments).

Figure 14:
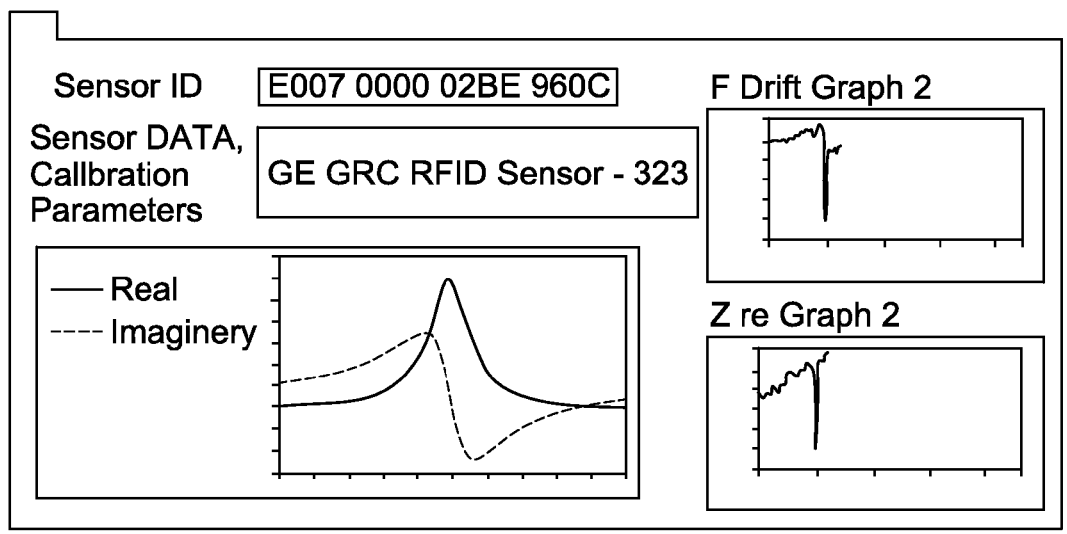
FIG. 14 is a graph of example analog and digital data acquired using integrated interrogation of the invention.

To validate this approach, a Texas Instruments RFID tag was used. The tag was coated with a polyaniline sensing film to fabricate a pH sensor. As shown in FIG. 14, the digital ID of the tag was read with the writer/reader as defined above to be E007 000 02BE 960C. Subsequently, the writer/reader was used to write additional digital data into the memory chip. In the illustrated example, the written data was GE GRC RFID Sensor #323. In another example, the written data was A0=0.256; A1=33.89; A2=0.00421; A3=0.0115, where A0, A1, A2 and A3 were the calibration coefficients for the sensor response. The writer/reader was further used in the reading mode to read digital portion from the sensor and analog portion (impedance).

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. An integrated interrogator for a Radio Frequency Identification (RFID) sensor, comprising:
 a digital portion in communication with the RFID sensor, wherein the digital portion is configured to read a digital identification of the sensor;
 an analog portion in communication with the RFID sensor, wherein the analog portion is configured to read at least two parameters comprising capacitance, resistance and inductance of a sensing film disposed on the RFID sensor, and wherein the analog portion is operatively coupled to an analog input of an integrated circuit chip of the RFID sensor; and one or more controllers that coordinate actions of the digital and the analog portions.

2. The integrated interrogator of claim 1, wherein a range of scanning frequencies of the analog portion is within a frequency band of the digital portion.

3. The integrated interrogator of claim 1, wherein a range of scanning frequencies of the analog portion is higher or lower relative to a frequency band of the digital portion, and wherein the range of scanning frequencies is within 10 MHz of the frequency band of the digital portion.

4. The integrated interrogator of claim 1, wherein the analog portion operates at two or more power levels.

5. The integrated interrogator of claim 1, wherein the digital portion comprises a single-frequency, single-protocol reading device, or a multi-frequency, multi-protocol reading device.

6. The integrated interrogator of claim 1, further comprising a communication module that communicates with one or more devices external to the RFID sensor.

7. The integrated interrogator of claim 1, further comprising a central computing center remotely located with respect to the integrated interrogator.

8. The integrated interrogator of claim 7, wherein the central computing center analyzes at least a portion of an impedance spectrum using multivariate analysis, steady state responses, or dynamic responses.

9. The integrated interrogator of claim 1, wherein the analog portion is in communication with a sensor antenna.

10. The integrated interrogator of claim 1, wherein the RFID sensor comprises at least two analog sensing inputs.

11. An interrogation system for interrogation of one or more RFID sensors, comprising:
a sensor antenna that receives and transmits a signal from the one or more RFID sensors;
an integrated interrogator operatively coupled to one or more of the one or more RFID sensors, comprising:
an analog portion that measures at least two parameters comprising capacitance, resistance and inductance of a sensing film disposed on the one or more RFID sensors, wherein the analog portion is operatively coupled to an analog input of an integrated circuit chip of the RFID sensor;
a digital portion that reads data from a memory chip of the RFID sensors; and
a controller that coordinates actions of the analog portion and the digital portion.

12. The interrogation system of claim 11, wherein a scanning frequency range of a sensor response reader is from about 3 MHz to about 25 MHz.

13. The interrogation system of claim 11, further comprising a communication module that communicates with one or both of the analog portion and the digital portion.

14. The interrogation system of claim 11, wherein the controller comprises an electronic switch that switches between analog and digital data acquisition from the analog portion and the digital portion, respectively.

15. The interrogation system of claim 11, wherein at least one of the RFID sensors comprises a sensing film that is responsive to a change in an environmental parameter.

16. The interrogation system of claim 11, further comprising a central computing center in communication with the integrated interrogator.

17. The interrogation system of claim 16, wherein the central computing center is remotely located with respect to the RFID sensors.

18. The interrogation system of claim 11, wherein two or more RFID sensors are operatively coupled to a common integrated interrogator.

* * * * *